United States Patent [19]

D'Entremont et al.

[11] Patent Number: 5,200,872

[45] Date of Patent: Apr. 6, 1993

[54] INTERNAL PROTECTION CIRCUIT FOR ELECTRICALLY DRIVEN DEVICE

[75] Inventors: John R. D'Entremont, Foxboro, Mass.; Howard H. Fraser, Jr., Lafayette; James C. Wilson, Cazenovia, both of N.Y.

[73] Assignee: Texas Instruments Incorporated, Dallas, Tex.

[21] Appl. No.: 832,642

[22] Filed: Feb. 7, 1992

Related U.S. Application Data

[63] Continuation of Ser. No. 449,689, Dec. 8, 1989, abandoned.

[51] Int. Cl.$^5$ .................... H02H 7/08; H02K 11/00
[52] U.S. Cl. .................... 361/25; 361/103; 310/68 C
[58] Field of Search .............. 307/117, 118; 318/452, 318/471; 337/104, 113, 368; 361/25, 26, 27, 103, 105, 107; 417/902; 310/68 R, 68 C

[56] References Cited

U.S. PATENT DOCUMENTS

| | | | |
|---|---|---|---|
| Re. 31,367 | 8/1983 | D'entremont | 361/27 |
| 2,682,005 | 6/1954 | Hemphill et al. | 310/68 C |
| 3,155,877 | 11/1964 | Jensen | 317/13 |
| 3,474,372 | 10/1969 | Davenport et al. | 337/102 |
| 3,544,869 | 12/1970 | Plouffe et al. | 318/221 |
| 3,586,910 | 6/1971 | Sauber | 317/13 |
| 3,636,426 | 1/1972 | Buiting | 318/471 |
| 3,695,054 | 10/1972 | Barry | 62/115 |
| 3,718,879 | 2/1973 | Perry | 337/95 |
| 3,852,648 | 12/1974 | Barry et al. | 318/221 H |
| 3,898,527 | 8/1975 | Cawley | 317/13 R |
| 3,913,342 | 10/1975 | Barry | 62/115 |
| 3,921,117 | 11/1975 | Blaha | 338/13 |
| 3,959,984 | 6/1976 | Vlasak | 62/229 |
| 3,965,392 | 6/1976 | Moorhead et al. | 317/13 A |
| 4,086,558 | 4/1978 | Pejouhy et al. | 337/102 |
| 4,224,591 | 9/1980 | Senor | 337/102 |
| 4,376,926 | 3/1983 | Senor | 337/104 |
| 4,450,496 | 5/1984 | Doljack et al. | 361/58 |
| 4,518,324 | 5/1985 | Mizuno et al. | 417/366 |
| 4,563,624 | 1/1986 | Yu | 318/472 |
| 4,716,486 | 12/1987 | Sobiepanek et al. | 361/24 |
| 4,761,592 | 8/1988 | Dissing et al. | 318/471 |
| 4,928,503 | 5/1990 | Riffe | 62/498 |
| 4,955,795 | 9/1990 | Griffith | 417/44 |
| 5,055,726 | 10/1991 | D'entremont et al. | 310/71 |

Primary Examiner—Steven L. Stephan
Assistant Examiner—D. R. Haszko
Attorney, Agent, or Firm—Russell E. Baumann; Richard L. Donaldson; Rene E. Grossman

[57] ABSTRACT

Protection for an encased motor driven device is enhanced by utilizing additional sensors with associated resistance heaters to actuate the thermally responsive contacts of the internal line break. The sensors and heaters are powered from an auxiliary winding in the motor coils. When applied to a hermetic scroll compressor, the compressor can be protected against reverse rotation.

32 Claims, 3 Drawing Sheets

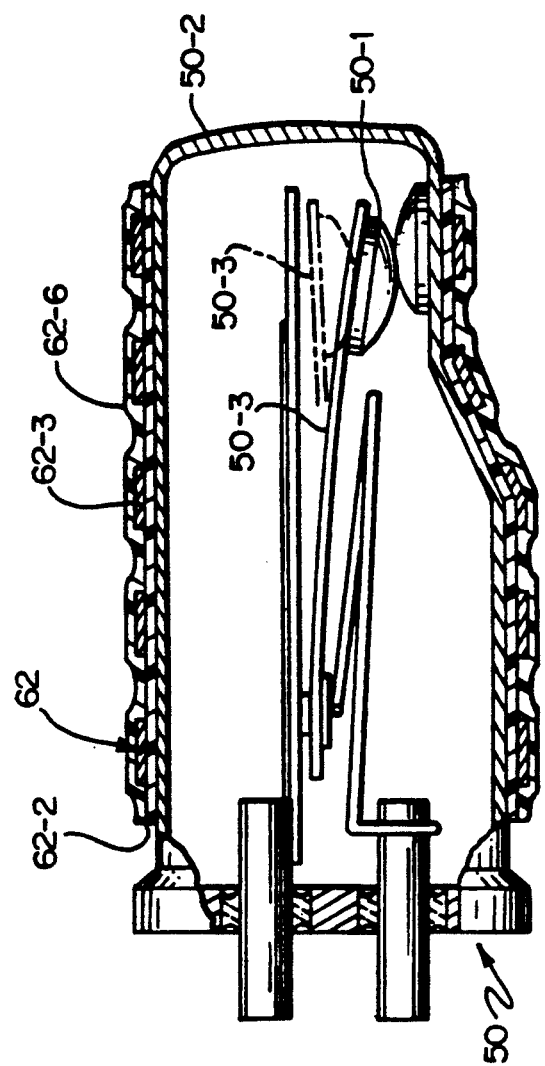
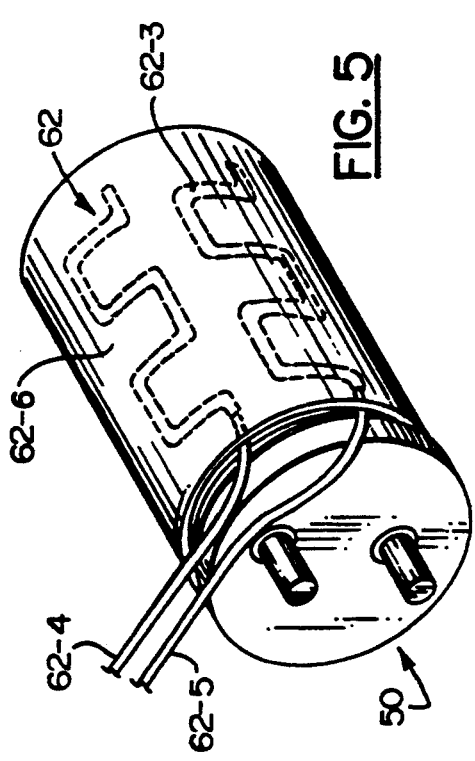
FIG. 5
FIG. 6

INTERNAL PROTECTION CIRCUIT FOR ELECTRICALLY DRIVEN DEVICE

This application is a continuation of application Ser. No. 07/449,689, filed Dec. 8, 1989, now abandoned.

BACKGROUND OF THE INVENTION

The present invention relates generally to encased, electric motor driven devices and, more particularly, to a protection circuit for a fluid machine such as a hermetic compressor, having an internal electric motor drive. Fluid machines can be classified in many ways. By function they are classified as: (1) compressors, where the fluid machine acts on a gas to increase its pressure and reduce its volume, (2) pumps, where the fluid machine does not reduce the volume of the fluid in the device but moves the fluid from one place to another but may increase the pressure of the fluid in forcing it into the place of delivery; and (3) expanders, where pressurized fluid acts on the fluid machine causing it to move while the fluid increases in volume and decreases in pressure such as where steam acts on a turbine. A compressor and an expander are basically the same device with reversed operation. A pump and a compressor differ basically in whether or not the volume of the fluid changes in the device. The same basic structure can thus act as a pump, compressor or expander for some types of fluid machines.

Where classified by operation, a fluid machine is either centrifugal, in which velocity is converted to pressure, or positive displacement, where a volume of fluid is trapped and compressed, expanded or just moved. The positive displacement fluid machines are classified as reciprocating, as where there is a reciprocating piston acting in a cylinder, or as rotary. Rotary includes: (1) screw compressors, where the fluid is trapped in spaces partially defined by the lobes and grooves of the rotors, or, for a single screw compressor, where the fluid is trapped in spaces partially defined by the rotor, (2) scroll compressors, where the fluid is trapped in spaces partially defined between the wraps of the fixed and orbiting scroll members; (3) rotary vane, where a piston carrying radial vanes is rotated in a cylinder with the fluid being trapped between vanes; (4) fixed vane, or rolling piston, where the vane reciprocates to maintain sealing contact with an eccentric piston, with the piston contacting the wall of the cylinder and the vane to define the trapped volumes.

When classified by their housing or casing, fluid machines are classified as open drive, semi-hermetic and hermetic. In open drive machines, the crankshaft extends through the shell in which the portion of the fluid machine that acts on the fluid is located, but the driving means is located outside of the shell. In semi-hermetic machines the entire machine is within the shell but is field serviceable by the removal of sealed panels. Hermetic machines are entirely located within the shell which is welded together.

When classified by use, fluid machines are used either in an open system, as where air is the fluid and is exhausted to the atmosphere, or in a closed system such as one using Freon or some other refrigerant which is continuously circulated through the system during operation. In a closed system with a fluid machine acting as a compressor of a refrigerant, and having a hermetic casing or shell, the shell will be filled with refrigerant. If all or most of the shell is filled with refrigerant at suction pressure, then the compressor is referred to as a low side compressor, while if the shell is filled with refrigerant at discharge pressure, it is referred to as a high side compressor.

Because of shell strength requirements, hermetic compressors are limited in size and are typically used only in residential and light commercial air conditioning and refrigeration applications. The shell is penetrated by the suction and discharge lines and by the electric power input. This is the minimum number of penetrations and therefore the minimum sealing requirement. The interior of the shell normally has very little unused space available because of the desire to minimize the cubage, weight, material costs, and the amount of refrigerant within the shell.

Compressor protection is achieved by interrupting power to the compressor when it is operating under an undesirable condition. This protection is normally achieved by a stator mounted, thermally responsive switch located in the power line to the motor. This switch responds to excess motor temperature and/or an overcurrent by opening and thereby breaking the electrical circuit to stop the compressor.

There are, however, other conditions under which it is desirable to stop compressor operation in order to protect the compressor. These conditions include high discharge temperature, excessive pressure ratio, high superheat, and loss of charge. In scroll compressors, specifically, these conditions may produce an excessive thermal gradient in the scroll members between the inlet and outlet due to the heating of the refrigerant during compression. Also, a scroll compressor is capable of reverse operation wherein it acts as an expander when reverse flow is permitted, or as a vacuum pump if flow is blocked. A check valve in the discharge line prevents the reverse flow necessary for expander operation but traps a volume which is evacuated by the reverse operation of the compressor which acts as a vacuum pump because the reverse flow is limited to the fluid in the trapped volume. Each of the above-identified thermally abusive conditions can be sensed either directly or indirectly through a thermal sensor. Reverse rotation and excessive pressure ratio can also be sensed through pressure sensors. The sensing of the temperature of the compressor discharge gas or of the central portion of the fixed scroll of a scroll compressor will provide an indication of compressor operation problems that can be due to a number of conditions, as indicated above, requiring compressor operation to be stopped, although the specific cause for the temperature increase will not necessarily be known. The reverse direction of rotation of the motor of a scroll compressor can be sensed as a low pressure/vacuum at the compressor discharge where the supply flow is blocked and it becomes desirable to stop the compressor in response thereto. Major problems in sensing other conditions and in stopping the compressor in response thereto are: the limited internal space available, the problems with additional penetration of the shell, cost, and the need to power the sensors and/or responsive circuitry.

SUMMARY OF THE INVENTION

Additional sensors are located within the shell of an enclosed, electric motor driven device. In the case of a hermetic scroll compressor, specifically, one sensor is provided to sense the temperature of the central portion of the fixed scroll or of the discharge gas, and another sensor is provided to sense the discharge pressure as indicative of the direction of rotation of the motor. The additional sensors are coupled to an internal line break such that if temperatures are exceeded in the fixed scroll or discharge gas, for any reason, or if the motor is running in reverse, the line break will trip. The additional sensors and responsive circuitry are powered from an auxiliary winding placed in the motor to yield a low voltage such as 12 or 24 volts. As an alternative to the pressure sensor being used in a fluid machine to detect reverse operation by the sensing of a low pressure condition, the sensor may be responsive to high pressure to sense other undesirable conditions. Also, the pressure sensor can be responsive to a differential pressure, or two pressure sensors can be used.

It is an object of this invention to improve the reliability of shell encased electric motor driven devices.

It is an additional object of this invention to improve the reliability of hermetic fluid machine including compressors, expanders and pumps.

It is another object of this invention to provide additional internal sensors for hermetic fluid machines.

It is a further object of this invention to incorporate added protection into the existing protection features of a fluid machine.

It is an additional object of this invention to provide added internal protection for a hermetic scroll compressor by tying additional sensors to the existing internal line break protection system.

It is another object of this invention to protect the scroll elements of a hermetic scroll compressor from excess temperatures and reverse rotation.

It is a further object of this invention to provide additional internal protection for a hermetic compressor without requiring additional terminal feeds through the shell. These objects, and others as will become apparent hereinafter, are accomplished by the present invention.

Basically, additional sensors are located within the shell of an electric motor driven device. The sensors are thermally coupled to the existing internal line break protection system through auxiliary heater(s) in heat transfer relation with the line break and are powered by an auxiliary winding placed in the motor. The auxiliary heater(s) may be formed by bonding a resistive grid on a flexible sheet of electrically insulating material which is wrapped around the housing of the line break. A heat shrinkable sleeve of electrically insulating material is placed over the grid and the connections of electrical leads to the grid.

BRIEF DESCRIPTION OF THE DRAWINGS

For a fuller understanding of the present invention, reference should now be made to the following detailed description thereof taken in conjunction with the accompanying drawings wherein:

FIG. 5 is a perspective view of a line break device useful in the present invention having an auxiliary heater mounted in heat transfer relations therewith; and FIG. 6 is a cross sectional view of the FIG. 5 device and heater.

DESCRIPTION OF THE PREFERRED EMBODIMENTS

Figure 1:
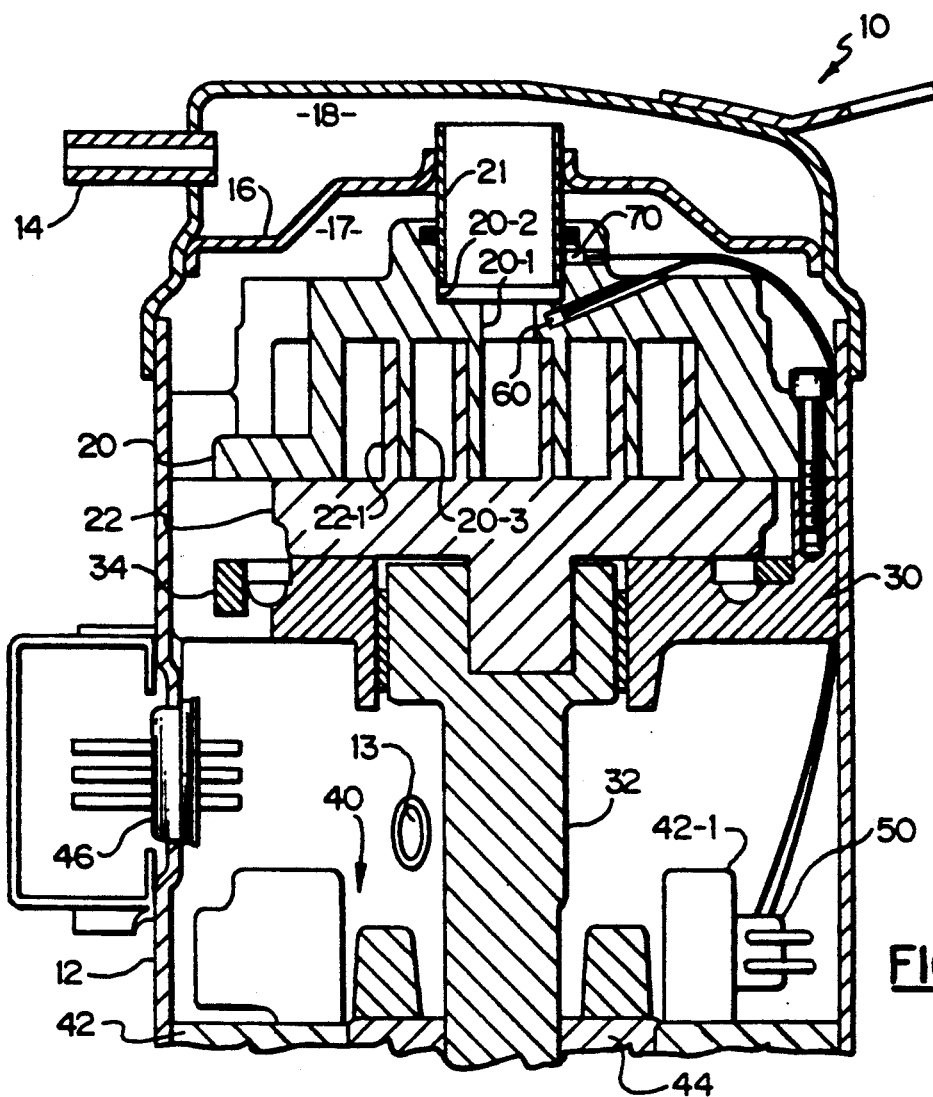
FIG. 1 is a partial sectional view of a low side hermetic scroll compressor employing the present invention.

In FIG. 1, the numeral 10 generally designates a low side hermetic scroll compressor having a shell 12 with an inlet 13 and a discharge 14 extending through shell 12. Divider plate 16 divides the interior of shell 12 into low side chamber 17 and discharge chamber 18. Scroll compressor 10 includes fixed scroll 20, orbiting scroll 22, crankcase 30, crankshaft 32, anti-rotation means 34 and motor 40 which is made up of stator 42 and rotor 44. Electrical power is supplied through hermetic terminal 46. An internal line break 50 is located on main motor windings or coils 42-1. The structure described so far is generally conventional. The present invention adds additional sensors which are located within shell 12 and coupled to internal line break 50. For a scroll compressor, desirable additional sensors would include a temperature sensor 60 for sensing the temperature at the central/discharge portion of fixed scroll 20 and a discharge pressure sensor 70 also located in the outlet portion of fixed scroll 20. The discharge path within shell 12 serially includes the bore 20-1 defining the central/discharge portion of fixed scroll 20, bore 20-2, tube 21 which is welded or otherwise sealed to divider plate 16, and discharge chamber 18 which connects to discharge 14. The temperature sensor 60 will directly sense the temperature of the fixed scroll 20 in its central/outlet portion 20-1 and indirectly sense the discharge temperature so that the sensed temperature can be influenced by the temperature of the compressed refrigerant which is, in turn, influenced by the pressure ratio across the compressor, high superheat, and loss of refrigerant charge. Additionally, upon reverse rotation, if reverse flow is blocked by a check valve (not illustrated) the compressor will pull a vacuum which is unique to reverse rotation and while the crankshaft 32 will continue to be lubricated, there will be no mass flow of refrigerant and entrained oil to lubricate and cool the scroll elements or wraps 20-3 and 22-1 so that they will heat up due to friction and provide a thermal indication of reverse rotation. Additionally, motor 40 may also overheat due to the absence of refrigerant gas passing over windings 42-1. Further, the pressure sensor 70 will sense the pressure of the refrigerant passing through discharge 20-1 in fixed scroll 20 which in the case of reverse rotation will be a low pressure or vacuum so must be sensed upstream of the check valve (not illustrated). If high pressure is being sensed internally of shell 12 it can be at any convenient point in the discharge flow path between central/outlet portion or discharge 20-1 and discharge 14. The low pressure/vacuum will, however, provide the earliest indication of reverse operation. A second pressure sensor would generally be required if both reverse rotation and high pressure are to be sensed or if just the differential pressure is to be sensed. A pressure sensor responsive to both high and low pressure can be used in addition to the low pressure sensor to sense both differential pressure and reverse rotation. If necessary, or desired, other or additional sensors such as oil temperature, oil level, high refrigerant pressure, etc. may be employed. It should be understood that the present invention is intended to be applicable to the use of any suitable sensor that senses a threshold condition, i.e. pressure, temperature, etc., of the compressor or other fluid machine and such sensors can be located at any of the various suitable locations within the system enclosure.

Figure 2:
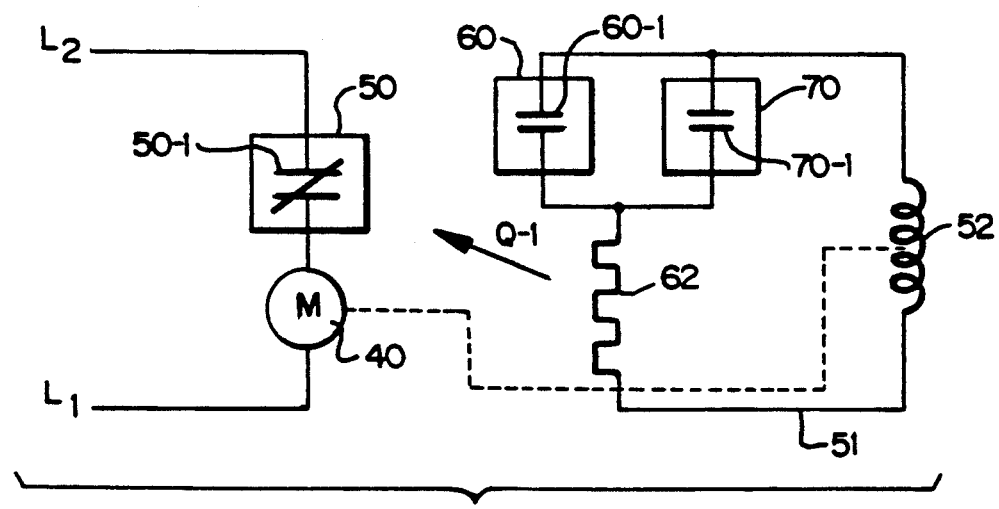
FIG. 2 is a circuit diagram of a first embodiment of the present invention as applied to a single phase motor.
Figure 3:
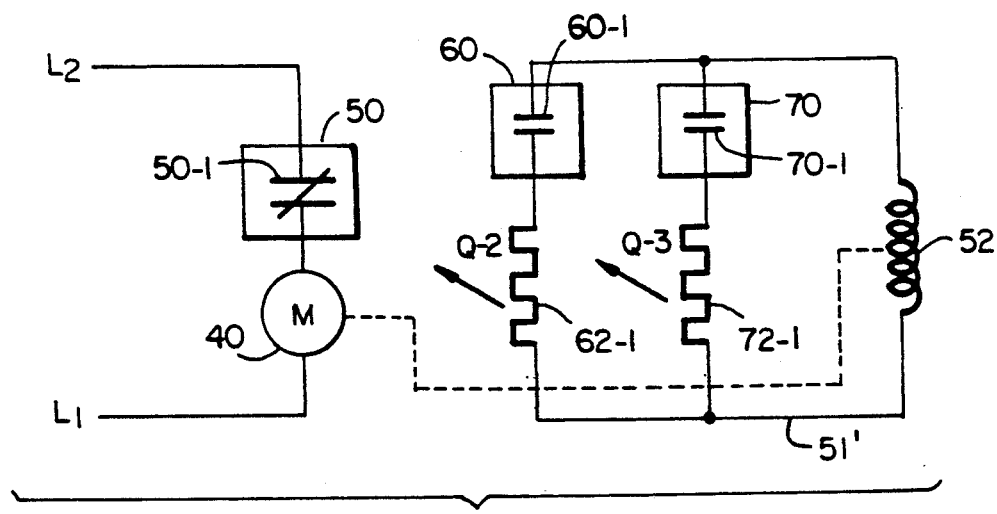
FIG. 3 is a circuit diagram of a second embodiment of the present invention as applied to a single phase motor.

Referring now to FIG. 2, $L_1$ and $L_2$ represent the electric line inputs which are connected to main winding 42-1 and run capacitor (not illustrated), of motor 40 in a circuit which contains internal line break switch 50, having normally closed thermally responsive contacts 50-1, as is conventional. A suitable internal line break is disclosed in U.S. Pat. No. 4,376,926. Temperature sensor 60 has normally open thermostatically responsive contacts 60-1 and is located so as to be responsive to the temperature at the center of the fixed scroll 20 or, alternatively, at the discharge 20-1 but is, preferably, not exposed directly to the discharge gas or the pressure at discharge 20-1. Pressure sensor 70 has normally open pressure responsive contacts 70-1 and is located so as to be exposed to and responsive to the pressure at discharge 20-1 or any other convenient location in the discharge flow path in shell 12. Auxiliary winding 52 is placed within the stator slots but is insulated and separate from torque producing coils or windings 42-1. Auxiliary winding 52 is acted on by the alternating magnetic flux normally present in motor 40 and, as a result, an induced low voltage is produced in winding 52. The resultant low voltage, e.g. 12 or 24 volts, is supplied to the circuit 51 containing auxiliary winding 52, temperature sensor 60 and pressure sensor 70. In circuit 51 temperature sensor 60 and pressure sensor 70 are in parallel and in series with resistance heater 62 which is thermally coupled to the thermally responsive contacts 50-1 of internal line break 50. The circuit 51' of FIG. 3 is identical to circuit 51 of FIG. 2 except that an additional resistance heater 72-1 is provided so that sensor 60 and its associated heater 62-1 is in parallel with sensor 70 and its associated heater 72-1. In the case of circuit 51', both of the heaters 62-1 and 72-1 are thermally coupled to the thermally responsive contacts 50-1 of internal line break 50.

In FIG. 2, the contacts 60-1 and 70-1 will be open so that circuit 51 is an open circuit under normal operating conditions. If temperature sensor 60 senses a temperature equal to or in excess of its actuation temperature, contacts 60-1 will close completing a circuit. As a result, coil 52 will supply electrical energy to resistance heater 62 producing enough heat, indicated by Q-1, to cause contacts 50-1 to open and thereby stop motor 40 and compressor 10. Assuming that pressure sensor 70 is to be responsive to reverse rotation, contacts 70-1 will close upon the creation of a very low pressure or vacuum in discharge 20-1 and this will complete a circuit to resistance heater 62 producing enough heat, indicated by Q-1, to cause contacts 50-1 to open and thereby stop motor 40 and compressor 10. If pressure sensor 70 is responsive to high pressure or a pressure differential, contacts 70-1 would close upon the sensing of the preset pressure or pressure difference but the operation of the circuit 51 and heater coil 62 would otherwise be the same.

With particular reference to FIGS. 5 and 6 a line break 50 useful in practicing the present invention is shown comprising a tubular housing 50-2 of electrically and thermally conductive material such as low carbon steel. Normally closed contacts 50-1 are mounted on the housing wall on the free end of a cantilever mounted, thermally responsive snap-acting thermostat member 50-3 respectively. Upon over temperature or over current conditions of motor 40 snap-acting member 50-3 snaps to an open contacts position, indicated by the dashed lines in FIG. 6, to de-energize the motor. Specific details of construction of line break or protector device 50 may be had by reference to U.S. Pat. No. 4,376,926 mentioned above.

In addition to heating elements provided within line break 50 which are adapted to be connected to selected motor windings and in accordance with the present invention an auxiliary heater 62 is provided. Heater 62 comprises a flexible sheet 62-2 of high temperature resin, such as a polyimide polymer on which a grid 62-3 of resistive material has been disposed in a conventional manner, such as printing by silk screening a suitable ink to provide a resistance typically in the range of approximately 1 to 100 ohms. One heater of this type was made having a resistance of approximately 10 ohms. Other high temperature resins such as benzophenones, polyamideimide, polybenzothiazoles, phosphonitrilic, etc. may be used for sheet 62-2. The resistive material may be formed, for example, from a synthetic resin material of the type mentioned above but with particles of carbon, e.g. graphite and a minor amount of silver or nickel power interspersed therein.

Leads 62-4, 62-5 having electrically insulating sleeves thereon have end portions stripped of the insulating sleeves with end portions attached to opposite, spaced portions of grid 62-3 in a conventional manner, as by soldering. If more than one auxiliary heater is desired, as in the FIG. 3 embodiment referred to above, two or more resistive paths are provided in grid 62-3 with appropriate leads for connecting the heaters in circuit 51. Sheet 62-2 is preferably provided with an adhesive underlayer and is wrapped about at least a portion of and preferably essentially the entire circumference of tubular housing 50-2 in close heat transfer relation therewith. Preferably a heat shrinkable sleeve 62-6 of electrically insulating material such as polyethylene terephthalate is placed over the printed heater grid 62-3 and is shrunk thereon to provide suitable over surface electrical clearance between the heater and leads and the line break 50 as well as strain relief for the leads.

Thus in the FIG. 2 embodiment when contacts 60-1 or 70-1 are closed the low voltage power source energizes auxiliary heater 62 raising its temperature with the heat generated thereby being conducted to the heat responsive member 50-3 to actuate the line break and open contacts 50-1.

Referring to FIG. 3, the operation of the device is similar to that of the FIG. 2. The closing of contacts 70-1 will cause heating of heater 72-1 rather than heater 62-1 but the resultant heat, indicated by Q-3, will cause contacts 50-1 to open and thereby stop motor 40 and compressor 10. The closing of contacts 60-1 will cause the heating of heater 62-1 and the resultant heat, indicated by Q-2, will cause contacts 50-1 to open and thereby stop motor 40 and compressor 10.

Figure 4:
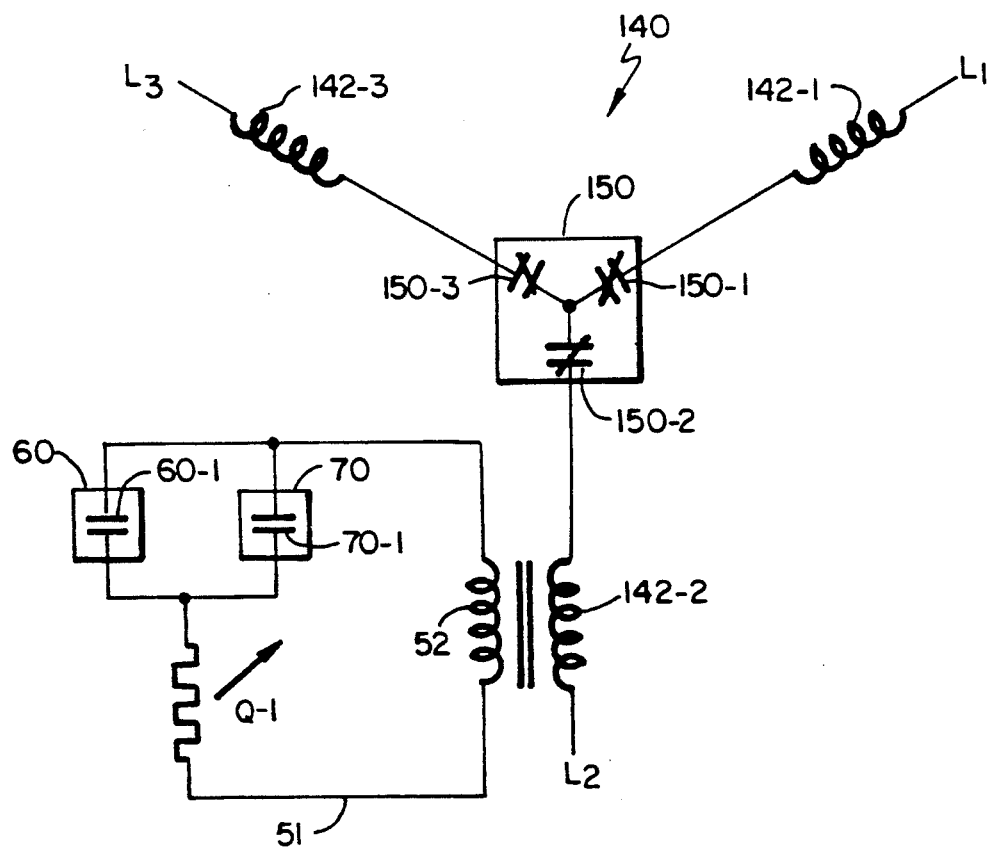
FIG. 4 is a circuit diagram of the present invention as applied to a three phase motor.

Referring now to FIG. 4, $L_1$, $L_2$ and $L_3$ are the electric line inputs for a 3-phase motor 140 and contain main windings 142-1 to 3, respectively, which are connected in a wye configuration and contain normally closed thermally responsive contacts 150-1 through 3, respectively, which collectively make up internal line break 150. Auxiliary winding 52 is placed within the stator slots of any one of windings 142-1 to 3. Winding 52 is insulated and supplies a low voltage, e.g. 12 or 24 volts, to the circuit 51 which is identical to that of FIG. 2 and contains auxiliary winding 52, temperature sensor 60 and pressure sensor 70. Because internal line break 150 has multiple thermally responsive contacts, 150-1 through 3, the heat Q-1 produced by resistance heater 62 acts on all of the contacts, 150-1 through 3. Otherwise, the operation of the FIG. 4 embodiment is the same as that of the FIG. 2 embodiment. Also, circuit 51' of FIG. 3 can be used in the FIG. 4 device and would operate as described above.

Although preferred embodiments of the present invention have been illustrated and described, other changes will occur to those skilled in the art. For example, although the description has been with respect to hermetic compressors in general and scroll compressors specifically, the invention is equally applicable to other types of encased, electric motor driven devices such as power tools, appliances and fluid machines such as pumps and expanders, and the choice of sensors and the manner in which they are connected to a line break would be made accordingly. If desired a manually operable on/off switch could be used in place of a sensor to directly control the energization of the auxiliary heater and concomitantly. Also, if present, necessary or desirable, a second power source can be used to power some or all of the sensors and their coils. It is therefore intended that the present invention is to be limited only by the scope of the appended claims.

What is claimed is:

1. A protection circuit for providing additional internal protection to a device contained within a shell of said device, said device being driven by an electric motor having an internal line break to interrupt electric motor power to said motor responsive to a specific operating condition of said motor, said circuit comprising:
   a sensor for detecting a predetermined condition of said device;
   power means disposed within said shell for providing power to said circuit including an auxiliary winding within said motor and electromagnetically coupled thereto for supplying power relatively lower than said power to said motor; means for assisting in actuating said line break including a heater thermally coupled to said break for thermal actuation thereof to interrupt power to said motor; and power connection means for connecting said power means to the heater in response to said sensor detecting a certain predetermined condition.

2. The protection circuit of claim 1 including a plurality of sensors for detecting various predetermined conditions of said device with each of said sensors causing said actuation means to interrupt power to said motor in response to the detection of a certain predetermined condition.

3. The protection circuit of said claim 1 wherein said sensor is a pressure sensor.

4. The protection circuit of claim 3 wherein said device is a fluid machine having a gas discharge path and said sensor is located to sense pressure in said gas discharge path.

5. The protection circuit of claim 4 wherein said sensor is adapted to detect a low pressure condition indicative of reverse rotation of said fluid machine.

6. The protection circuit of claim 1 wherein said sensor is a temperature sensor.

7. The protection circuit of claim 6 wherein said device includes a discharge path and said sensor is located so as to detect temperature in said discharge path.

8. The protection circuit of claim 1 wherein said power connection means includes at least one switch with normally open contacts which are closed in response to the detection of a certain predetermined operating condition.

9. The protection circuit of claim 8 including a plurality of switches disposed in parallel relationship such that any one of said plurality of switches can function to connect said power to said heater to actuate said line break.

10. In a shell enclosed device having an internal electric drive motor including motor windings, and an internal line break thermally responsive to said motor for interrupting power to said motor upon the occurrence of a specific temperature of current level in said motor, an internal protection circuit comprising:
    condition sensing means within said shell for sensing a predetermined condition within said shell;
    heater means thermally coupled to said internal line break;
    an auxiliary winding within said motor electromagnetically coupled to said motor windings for supplying relatively low power to said heater means when connected thereto; and
    actuating means responsive to said condition sensing means to connect said auxiliary winding to said heater means to assist in actuating said line break and interrupting power to said motor when a certain predetermined condition is sensed.

11. The internal protection circuit of claim 10 wherein said condition sensing means comprises a plurality of sensors located in said device to detect various predetermined operating conditions of said device, with each of said sensors causing said actuating means to interrupt power to said motor in response to the detection of a certain predetermined conditions.

12. The internal protection circuit of claim 10 wherein said condition sensing means comprises a pressure sensor.

13. The internal protection circuit of claim 12 wherein said device is a fluid machine with a gas discharge path and said sensor is located in sense the pressure conditions in said discharge path.

14. The internal protection circuit of claim 13 wherein said sensor is adapted to detect a certain low pressure condition which is indicative of reverse rotation of said fluid machine.

15. The internal protection circuit of claim 10 wherein said condition sensing means is a temperature sensor.

16. The internal protection circuit of claim 14 wherein said fluid machine includes a gas discharge path and said sensor is located to sense the temperature conditions is said gas discharge path.

17. The internal protection circuit of claim 10 wherein said actuating means includes at least one normally open switch which closes in response to the detection of a certain predetermined operating condition to thereby connect said auxiliary winding to said heater means.

18. The internal protection circuit of claim 17 including a plurality of switches disposed in relative parallel relationship such that the closing of any one switch in response to the detection of a certain predetermined condition will cause the said power means to be applied to said heater means and thereby actuate said line break to interrupt power to said motor.

19. In a hermetic scroll compressor having a shell, an inlet, fixed and orbiting scroll means, a gas discharge path, motor means within said shell including motor windings and an internal line break including normally closed contacts thermally responsive to the temperature and current of said motor means for opening and interrupting power to said motor means upon the occurrence of an excessive temperature or current in said motor means, additional internal protection comprising:

a circuit including an auxiliary winding within said motor means electromagnetically coupled thereto for supplying relatively low power to said circuit;

temperature sensing means within said shell and located in said fixed scroll means including normally open thermostatically responsive contacts responsive to a predetermined temperature at said discharge;

first resistance heater means in said circuit in series with said normally open contacts and thermally coupled to said normally closed thermally responsive contacts of said internal line break, whereby when said normally open thermostatically responsive contacts close responsive to a sensed predetermined temperature, said circuit provides power to said first resistance heater means causing said contacts of said internal line break to open and interrupt power to said motor means;

pressure sensing means within said shell and located in said fixed scroll means including normally open pressure responsive contacts located so as to be responsive to a predetermined low pressure in said gas discharge path, indicative of reverse rotation of said orbiting scroll means;

second resistance heater means in said circuit in series with said normally open contacts of said pressure sensing means and thermally coupled to said normally closed thermally responsive contacts of said internal line break whereby when said normally open pressure responsive contacts close responsive to a sensed predetermined low pressure, said circuit provides power to said second resistance heater means causing said contacts of said internal line break to open and interrupt power to said motor.

20. A control system comprising an electrical apparatus, electrical supply means to energize the electrical apparatus, electrical supply means to energize the electrical apparatus having first and second power lines, a line break comprising normally closed switching contacts serially connected to one of said power lines, thermally responsive means operably connected to the switching contacts adapted upon selected conditions of the electrical apparatus to open the switching contacts and de-energize the electrical apparatus, auxiliary heater means disposed in heat transfer relationship with the thermally responsive means, electrical energization means for energizing the auxiliary heater means including an auxiliary winding within the electrical apparatus to provide a low voltage power source and means to selectively energize the auxiliary heater to assist in control the state of energization of the electrical apparatus independently of the said selected conditions of the electrical apparatus.

21. The control system of claim 20 wherein the line break comprises a thermally conductive housing and auxiliary heater means comprises a flexible sheet of electrically insulative material, an electrically resistive grid disposed on the sheet, the sheet wrapped around at least a portion of the housing.

22. The control system of claim 21 wherein the sheet of electrically insulative material is adhesively affixed to the housing.

23. The control system of claim 21 wherein electrical leads are attached to spaced portions of the resistive grid and a heat shrinkable sleeve of electrically insulative material is disposed over the sheet covering the resistive grid and the electrical leads in the vicinity of the spaced portions to provide electrical over surface clearance and strain relief for the electrical leads.

24. The control system of claim 21 wherein the means of selectively energize the auxiliary heater includes a manually operable on/off switch.

25. The protection circuit of claim 21 wherein the line break comprises a thermally conductive housing and the actuation means includes a flexible sheet of electrically insulative material, an electrically resistive grid disposed on the sheet, the sheet wrapped around at least a portion of the housing.

26. The protection circuit of claim 25 wherein the sheet of electrically insulative material is adhesively affixed to the housing.

27. The protection circuit of claim 25 wherein electrical leads are attached to spaced portions of the resistive grid and a heat shrinkable sleeve of electrically insulative material is disposed over the sheet covering the resistive grid and the electrical leads in the vicinity of said space portion to provide electrical over surface clearance and strain relief for the electrical leads.

28. The internal protection circuit of claim 10 wherein the line break comprises a thermally conductive housing and the heater means comprises a flexible sheet of electrically insulative material, an electrically resistive grid disposed on the sheet, the sheet wrapped around at least a portion of the housing.

29. The internal protection circuit of claim 28 wherein the sheet of electrically insulative material is adhesively affixed to the housing.

30. The internal protection circuit of claim 28 wherein electrical leads are attached to spaced portions of the resistive grid and a heat shrinkable sleeve of electrically insulative material is disposed over the sheet covering the resistive grid and the electrical leads in the vicinity of said spaced portions to provide electrical over surface clearance and strain relief for the electrical leads.

31. The protection circuit of claim 25 wherein the actuation means includes a manually operable on/off switch.

32. The additional internal protection of claim 19 wherein the first and second resistance heater means comprise first and second portions respectively of an electrically resistive grid disposed on a flexible sheet of electrically insulative material, the sheet wrapped around at least a portion of the line break.

* * * * *